United States Patent
Cao et al.

(10) Patent No.: US 10,660,128 B1
(45) Date of Patent: May 19, 2020

(54) SYSTEMS AND METHODS FOR CARRIER SENSING AND SYMBOL TIMING BASED ON MULTI-ANTENNA EIGEN-VECTOR COMBINING

(71) Applicant: Marvell International Ltd., Hamilton (BM)

(72) Inventors: Rui Cao, Fremont, CA (US); Xiayu Zheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/123,037

(22) Filed: Sep. 6, 2018

Related U.S. Application Data (60) Provisional application No. 62/555,502, filed on Sep. 7, 2017.

(51) Int. Cl.
*H04W 74/08* (2009.01)
*H04L 27/26* (2006.01)
*H04B 7/06* (2006.01)
*H04B 7/0413* (2017.01)

(52) U.S. Cl.
CPC ...... *H04W 74/0808* (2013.01); *H04B 7/0634* (2013.01); *H04L 27/2662* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 9,019,991 B1* | 4/2015 | Zhang | H04L 29/02 370/330 |
| 2010/0330946 A1* | 12/2010 | Akkarakaran | H01Q 1/246 455/273 |
| 2011/0026621 A1* | 2/2011 | Kim, II | H04B 3/56 375/260 |
| 2014/0247186 A1* | 9/2014 | Daneshmand | G01S 19/215 342/357.59 |

\* cited by examiner

*Primary Examiner* — Mohamed A Kamara
*Assistant Examiner* — Saad Khawar (57) ABSTRACT

Systems and methods for carrier sensing and symbol timing in a multiple-antenna communication system are provided. A wireless receiver receives two or more signals from two or more antennas, respectively. A set of column vectors comprising time samples obtained from each of the received signals at the two or more antennas are generated. A multiple-antenna eigen-combining (MAEC) vector is computed based on the set of column vectors. The respective received signals are multiplied with a corresponding combining coefficient of the MAEC vector to obtain a respective weighted signal. A combined signal is generated by adding the respective weighted signals and carrier sensing and symbol timing is performed on the two or more received signals based on the combined signal.

20 Claims, 8 Drawing Sheets

SYSTEMS AND METHODS FOR CARRIER SENSING AND SYMBOL TIMING BASED ON MULTI-ANTENNA EIGEN-VECTOR COMBINING

CROSS-REFERENCE TO RELATED APPLICATION

This application claims the benefit under 35 U.S.C. § 119(e) of U.S. Provisional Patent Application No. 62/555,502, filed Sep. 7, 2017, which is hereby incorporated by reference herein in its entirety.

FIELD OF USE

This disclosure describes systems and techniques relating to carrier sensing (CS) and symbol timing (ST) in a wireless communication system, and specifically, methods and systems for CS and ST based on multiple-antenna eigen-vector combining.

BACKGROUND OF THE DISCLOSURE

Wireless local area networks (WLANs), also referred to as WiFi networks, typically include an access point (AP) and one or more client stations. Development of WLAN standards such as the Institute for Electrical and Electronics Engineering (IEEE) 802.11a, 802.11b, 802.11g, and 802.11n Standards has improved single-user peak data throughput in the network. For example, the IEEE 802.11b Standard single-user peak data throughput of 11 megabits per second (Mbps); the IEEE 802.11a and 802.11g Standards specify a single-user peak data throughput of 54 Mbps; the IEEE 802.11n Standard specifies a single-user peak data throughput of 600 Mbps; and IEEE 802.11ac Standard specifies a single-user peak data throughput in the gigabits per second (Gbps). Newer standards aim at providing even greater throughputs, such as throughputs in the tens of Gbps range.

Existing systems sometimes employ multiple receive antennas to improve reception through the selection of the stronger signal or combination of individual signals at a receiver. For example, in a multiple input multiple output (MIMO) system, signals from two or more receive antennas, which usually correspond to the same transmit signal, are combined to recover transmitted information at the receiver to improve decoding accuracy. However, decoding at a MIMO receiver generally cannot be done by superimposing the received signals due to multi-path fading.

SUMMARY

Systems and methods for carrier sensing and symbol timing in a multiple-antenna communication system are provided. In some embodiments, a wireless receiver receives two or more signals from two or more antennas, respectively, wherein each received signal includes a known, periodic reference signal transmitted over a respective wireless channel. A set of column vectors comprising time samples obtained from each of the received signals at the two or more antennas are generated. A multiple-antenna eigen-combining (MAEC) vector is computed based on the set of column vectors corresponding to the received signals at the two or more antennas. The respective received signals are multiplied with a corresponding combining coefficient of the MAEC vector to obtain a respective weighted signal. A combined signal is generated by adding the respective weighted signals and carrier sensing and symbol timing is performed on the two or more received signals based on the combined signal.

In some embodiments, computing the MAEC vector comprises generating a sum matrix comprising a sum of each of the set of column vectors multiplied by their respective conjugate transpose, and computing the MAEC vector by determining an eigenvector corresponding to a largest eigenvalue of the sum matrix.

In some embodiments, generating the set of column vectors comprises generating a set of [1×N] column vectors combining the received time samples from the respective received signals for a plurality of time samples, where N is the number of antennas. The MAEC vector is computed by computing a [N×N] matrix by multiplying the set of column vectors with their respective conjugate transpose, storing each of the computed [N×N] matrix corresponding to each time sample, calculating a sum matrix by adding each of the computed [N×N] matrix, and computing the MAEC vector corresponding to the largest eigenvalue of the sum matrix.

In some embodiments, the largest eigenvalue of the sum matrix is computed using a power iteration method.

In some embodiments, computing the MAEC vector comprises generating a set of [1×N] column vectors combining the received time samples from the respective received signals for a plurality of time samples, where N is the number of antennas, computing a [N×N] matrix by multiplying each of the set of [1×N] column vectors with their respective conjugate transpose, and computing a projection vector based on the computed [N×N] matrix for a most recent time sample and previously received time samples.

In some embodiments, a one-pole filter is applied to the most recently received time sample and the computed update vector (i.e., normalized projection vector). In some embodiments, the one pole filter may be a low pass filter.

In some embodiments, computing the MAEC vector comprises generating a set of [1×N] column vectors combining the received time samples from the respective received signals for a plurality of time samples, where N is the number of antennas, and computing a projection vector based on the [1×N] column vector for a most recent time sample and previously received time samples.

In some implementations, the computing the MAEC vector comprises generating a set of [1×N] column vectors combining the received time samples from the respective received signals for M time samples, where N is the number of antennas and M is a number of time samples less than total number of received time samples, computing a [N×N] matrix by multiplying each of the column vectors with their respective conjugate transpose, storing each of the computed [N×N] matrix corresponding to each of the M time samples, calculating a sum matrix by adding each of the computed [N×N] matrix, computing a projection vector based on the computed sum matrix corresponding to the most recent time sample, and updating the projection vector for each subsequently received time sample by applying a one pole filter to the projection vector computed for the previously received time sample.

In some implementations, computing the MAEC vector comprises generating a set of [1×N] column vectors combining the received time samples from the respective received signals for a plurality of time samples, where N is the number of antennas, computing a [N×N] matrix by multiplying each of the column vectors with their respective conjugate transpose, computing a sum matrix combining the [N×N] matrix for the received time sample and previously received time samples, updating the sum matrix using a low pass filter, computing a projection vector based on the updated sum matrix, and updating the projection vector for each received time sample by applying a one pole filter to the update vector (i.e., normalized projection vector) computed for the previously received time sample.

In some implementations, the known, periodic signal is transmitted as a short training field (STF) sequence in a beginning part of a preamble for wireless local area network (WLAN) communication.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for multi-antenna eigen-vector combining (MAEC) for carrier sensing (CS) and symbol timing (ST). Specifically, the present methods and systems provide an enhanced technique for coherently combining a signal received across multiple receive antennas based on computing an eigenvalue corresponding to the received signal at each of the multiple antennas.

In WLAN systems, the first part of a preamble of each packet (e.g., an OFDM packet, also referred to as a data unit) is a short training field (STF). The STF includes periodic sequences. For example, a legacy STF (LSTF, STF in legacy WLAN protocols such as IEEE 802.11 a/b/g/n) includes 10 repetitions of a 0.8 μs sequence. Carrier sensing (CS) and symbol timing (ST) are typically conducted based on the STF sequence. For example, a receiver performs carrier sensing to detect if there is a WiFi signal and performs symbol timing to detect frame or packet timing (e.g., the start time or the end time) of an OFDM packet from the detected WiFi signal.

In IEEE 802.11n and 802.11ac, a multi-antenna design is adopted into WiFi systems. Data detection performance can be improved by taking advantage of the multiple antennas, especially at low signal to noise ratio (SNR). But the system performance may be limited by the carrier sensing/symbol timing if received signals from the multiple antennas are not coherently combined.

Some existing systems adopt multi-antenna combining based on coherent phase estimation to improve performance at the multi-antenna receiver. However, in coherent phase-based multi antenna coherent combining (MACC), to enhance the carrier sensing/symbol timing performance, a unique coherent phase is usually applied for each antenna in a MIMO system. The combining phase is then estimated based on an ensemble phase difference between the respective signal phase corresponding to the received signal at each antenna and the corresponding signal phase of the received signal at the reference antenna. Such phase estimation can sometimes be highly dependent on the signal quality of the chosen reference antenna. Receiver performance can thus be significantly compromised when, for example, signal quality of the selected reference antenna is undesirable.

Accordingly, methods and techniques for multiple-antenna eigen combining are disclosed to enhance LSTF signal power through antenna combining. For MAEC, samples of received signals from multiple antennas are received by a receiver. In some embodiments, a receiver may be configured to receive two or more signals from two or more antennas including a known, periodic reference signal that has gone through a respective wireless channel via one of the two or more antennas. For a sequence of receive signal array $\vec{y}_0, \vec{y}_1, \ldots, \vec{y}_{K-1}$, a corresponding 1×N column vector is formed at each time sample k, where N is the number of receive antennas and K is number of time samples taken from each of the N antennas. The system designs a normalized MAEC vector $\vec{v}$ (i.e., MAEC vector) such that, when combined with the received signal $\vec{y}[k]$ maximizes the signal energy for the combined signal $y_c[k]$.

The combined output signal $y_c[k]$ for the sequence of receive signal array $\vec{y}_0, \vec{y}_1, \ldots, \vec{y}_{K-1}$, may therefore be obtained, according to Equation (1):

$$y_c[k] = \vec{v}^H \cdot \vec{y}[k] \quad (1)$$

The combined signal $y_c[k]$ is used to determine carrier sensing/symbol timing. Accordingly, in some embodiments, the disclosed system determines a normalized MAEC vector $\vec{v}$ for the Equation (1) $y_c[k] = \vec{v}^H \cdot \vec{y}[k]$, which maximizes the combined signal power. The combined signal power may be represented by the following formulation:

$$\text{Maximize } [\vec{y}_c^H \vec{y}_c], \text{ where } \vec{y}_c = [y_c[0], y_c[1], \beta y_c[K-1]]$$

In some embodiments, the MAEC vector $\vec{v}^H$ may be normalized to the number of antennas N, according to the Equation (2):

$$s.t. \quad \vec{v}^H \cdot \vec{v} = N \quad (2)$$

As mentioned above, the combined output signal $y_c[k]$ is used to compute the correlation and used to determine carrier sensing/symbol timing. In theory, the optimal MAEC vector $\vec{v}$ (i.e., MAEC vector) is the eigenvector corresponding to the largest eigenvalue of [N×N] matrix obtained by the formulation shown in Equation (3) below. That is, the sum of K [1×N] column vectors multiplied by its conjugate transpose to obtain a [N×N] matrix, where each column vector represents the received signal array at each of the N antennas at the kth time sample.

$$Y = \sum_{k=0}^{K-1} y[k] \cdot y^H[k] = U \sum U \quad (3)$$

Eigenvalues of the resultant [N×N] sum matrix Y may be calculated using any number of methods. In some embodiments, the eigenvalues corresponding to the sum matrix Y is calculated using a known power iteration method. In an embodiment in which Σ includes a descending order of eigenvalues, an optimal vector $\vec{v}_{opt}$ may be determined by the following equation (4):

$$v_{opt} = U(1,:) \quad (4)$$

To enhance the LSTF signal power through antenna combining, the disclosed system achieves optimal combining gain using MAEC. In some embodiments, the system will need to buffer the samples for the 8 μs LSTF duration to compute the optimal MAEC vector, as discussed below with reference to FIG. 2.

Figure 1:
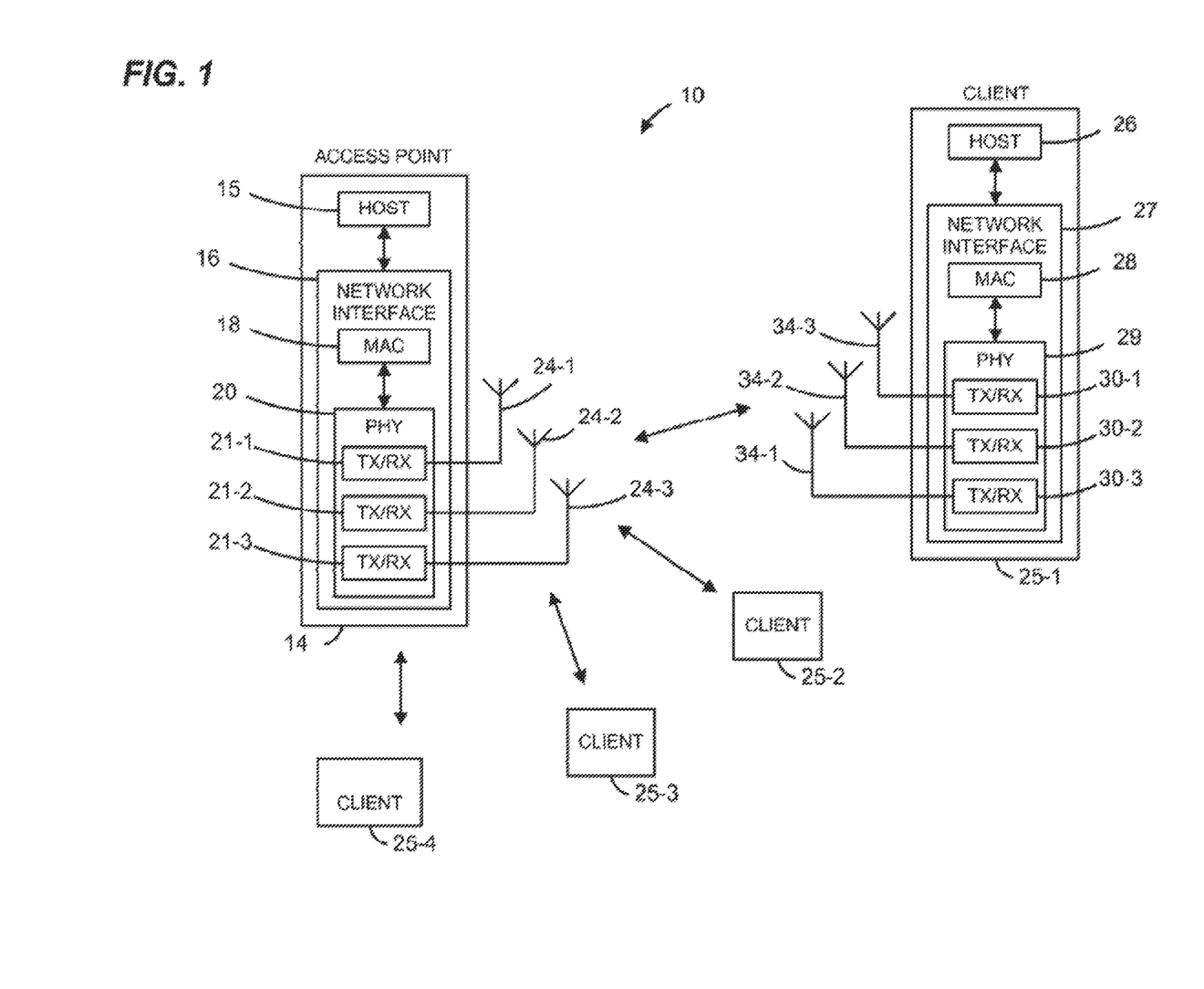
FIG. 1 is a block diagram showing an example of a wireless communication system.

FIG. 1 is a block diagram illustrating an example of a communication system, such as WLAN system 10, according to some embodiments described herein. The WLAN system 10 includes an access point (AP) 14 and multiple clients 25-1, 25-2, 25-3, and 25-4 (collectively clients 25). The AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21-1, 21-2, 21-3 (collectively, transceivers 21), and the transceivers 21 are coupled to a plurality of antennas 24. Although three transceivers 21 and three antennas 24-1, 24-2, and 24-3 (collectively, antennas 24) are illustrated in FIG. 1, the AP 14 includes other suitable numbers (1, 2, 3, 4, 5, etc.) of transceivers 21 and antennas 24 in other embodiments. In some embodiments, the MAC processing unit 18 and the PHY processing unit 20 are configured to operate according to a first communication protocol (e.g., IEEE 802.11ac). In some embodiments, the MAC processing unit 18 and the PHY processing unit 20 are configured to operate according to a second communication protocol (e.g., IEEE 802.11n). In further embodiments, the MAC processing unknit 18 and the PHY processing unit 20 are additionally configured to operate according to the second communication protocol, a third protocol, and/or a fourth communication protocol that supports MIMO communications (e.g., the IEEE 802.11a, 802.11b, and/or 802.11g).

The WLAN 10 includes a plurality of client stations 25. The client stations 25 can include access terminals (AT), wireless stations (STAs), mobile stations (MS), or other devices. Although four client stations 25 are illustrated in FIG. 1, the WLAN 10 includes other suitable numbers (1, 2, 3, 4, 5, etc.) of client stations 25 in various scenarios and embodiments. The client stations 25 (e.g., client station 25-1) can be configured to operate according to a communications protocol that supports MIMO communications (e.g., IEEE 802.11n or 802.11ac). In some instances, a client station 25 can be configured to operate according to another communication protocol (e.g., IEEE 802.11a, 802.11b, and/or 802.11g).

The client stations 25-1 includes a host processor 26 coupled to a network interface device 27. The network interface device 27 includes a MAC processing unit 28 and a PHY processing unit 29. The PHY processing unit 29 includes a plurality of transceivers 30-1, 30-2, and 30-3 (collectively, transceivers 30), and the transceivers 30 are coupled to one or more antennas 34-1, 34-2, and 34-3 (collectively, antennas 34). Although three transceivers 30 and three antennas 34 are illustrated in FIG. 1, the client station 25-1 includes other suitable numbers (1, 2, 3, 4, 5, etc.) of transceivers 30 and antennas 34 in other embodiments.

In some embodiments, the PHY processing unit 20 of the AP 14 is configured to generate data units conforming to a communications protocol and having corresponding formats. For example, the data units include a preamble that includes a short training field (STF) in a beginning part of the preamble. The PHY processing unit 20 of the AP 14 can use a known, periodic reference sequence (also known as pilot or training sequence) as the STF sequence of the data units. The transceiver(s) 21 is/are configured to transmit the generated data units via the antenna(s) 24. Similarly, the transceiver(s) 21 is/are configured to receive the data units via the antenna(s) 24. The PHY processing unit of the AP 14 is configured to process received data units conforming to the communication protocol and having corresponding formats and to determine that such data units conform to the communication protocol, according to various embodiments.

In some embodiments, the PHY processing unit 29 of the client device 25-1 is configured to generate data units conforming to the communication protocol and having corresponding formats. For example, the data units include a preamble that includes an STF in the beginning part of the preamble. The PHY processing unit 29 of the client device 25-1 can use a known, periodic reference sequence as the STF sequence of the data units. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the communication protocol and having corresponding formats and to determine that such data units conform to the communication protocol, according to various embodiments.

Figure 2:
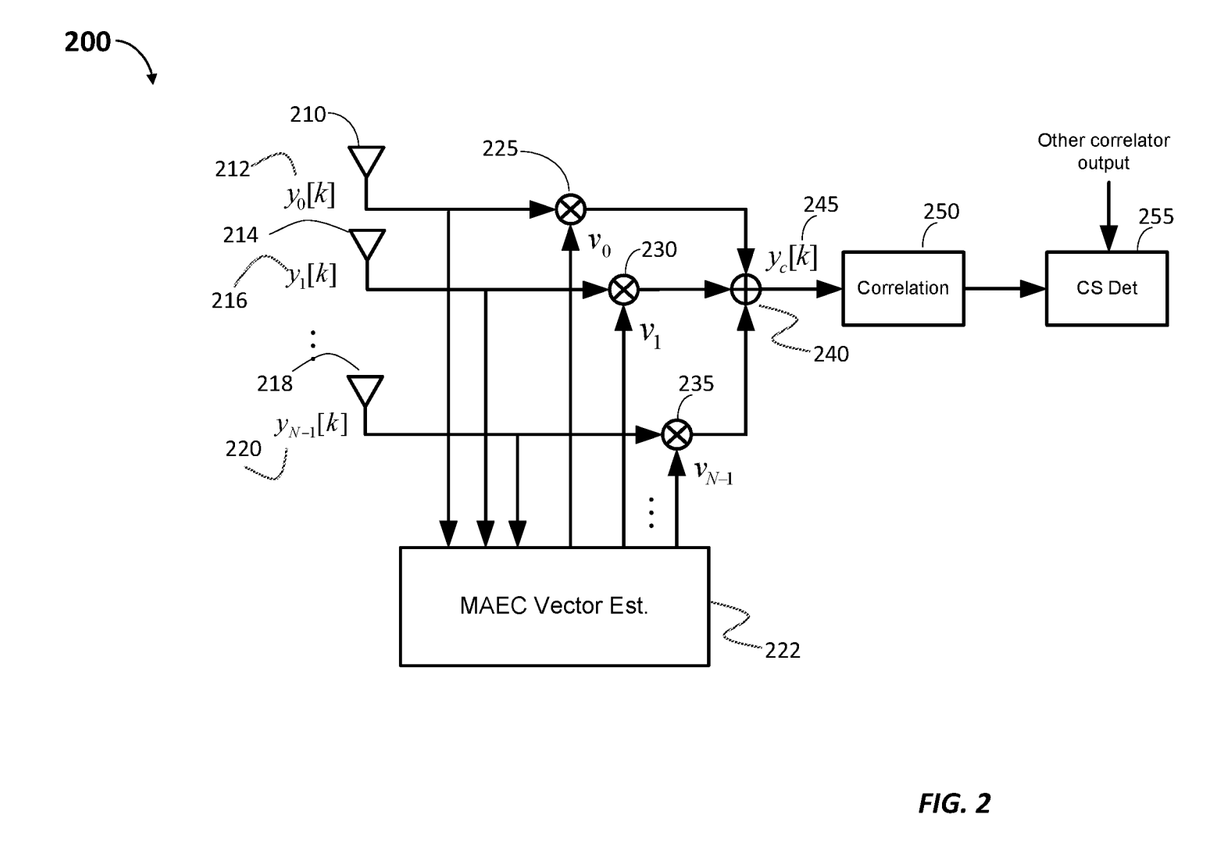
FIG. 2 is a diagram of an example of a receiving device for performing multi-antenna eigen combining (MAEC) for carrier sensing (CS) and symbol timing (ST).

FIG. 2 is a diagram of an example receiving device 300 for performing MAEC for carrier sensing/symbol timing. The device 200 includes, among other things, at least antennas 210, 212, 214, and 218, a MAEC vector estimation module 222 a correlator 250, and a CS Determinator 255. In general, for a multiple-antenna system, a receiving device can include N≥2 receiving antennas.

Specifically, the device 300 receives three signals $y_0[k]$ 212, $y_1[k]$ 216, and $y_{N-1}[k]$ 220 from the antennas 210, 214, and 218 respectively. The signals $y_0[k]$ 212, $y_1[k]$ 216, and $y_{N-1}[k]$ 220 can be the STF sequences that include multiple repetitions of a known reference sequence that have gone through respective wireless channels via the respective antennas 210, 214, and 218. In some embodiments, the signals $y_0[k]$ 212, $y_1[k]$ 216, and $y_{N-1}[k]$ 220 represent analog-to-digital converter (ADC) samples of the received signal streams, respectively.

The MAEC vector estimation module 222 performs eigen-combining by generating a MAEC vector for the received signals $y_0[k]$ 212, $y_1[k]$ 216, and $y_{N-1}[k]$ 220. In some embodiments, the MAEC vector estimation module 222 generates a MAEC vector having the combining coefficients $v_0$, $v_1$, and $v_{N-1}$ corresponding to each of the received signals $y_0[k]$ 212, $y_1[k]$ 216, and $y_{N-1}[k]$ 220 at the respective antennas 210, 214, and 218. The MAEC vector combining coefficients $v_0$, $v_1$, and $v_{N-1}$ generated by the MAEC vector estimation module 222 are multiplied with the corresponding signals $y_0[k]$ 212, $y_1[k]$ 216, and $y_{N-1}[k]$ 220 by a respective multiplier 225, 230, and 235 to obtain a respective weighted signal. That is, the multiplier 325 outputs a weighted signal $v_0 \cdot y_0[k]$, the multiplier 230 outputs a weighted signal $v_1 \cdot y_1[k]$, and the multiplier 235 outputs a weighted signal $v_{N-1} \cdot y_{N-1}[k]$.

The weighted signals corresponding to each of the antennas 210, 214, 218 are summed together by an adder 240, resulting in a combined signal $y_c[k]$ 245 having the following formulation: $y_c[k] = \vec{v}^H \cdot \vec{y}[k]$. The combined output $y_c[k]$ 245 is used to compute the correlation and used to determine the carrier sensing and symbol timing. Specifically, the correlator 250 and the CS Determinator 255 together form a correlation path. The correlation path returns carrier sensing/symbol timing detection results (for example, whether there is WiFi signal and where the received OFDM packet starts).

In some embodiments, the combined signal $y_c[k]$ 245 is input into the correlator 350 for computing correlations of the received sequence using known methods. The correlation output is input in the CS Determinator 355 for carrier sensing/symbol timing. For example, the value of the correlation output is used to determine whether there is a WiFi signal, based on whether the correlation value is beyond or below a threshold. The locations of the peak and dip values of correlation output can be used to detect the starting and/or ending time of the OFDM packet.

Several techniques can be used for computing the MAEC vector for multi-antenna eigen combining, for example, based on the STF sequences to perform carrier sensing/symbol timing. As a first example, a batch estimation method for computing the MAEC vector is described with reference to FIG. 3.

Figure 3:
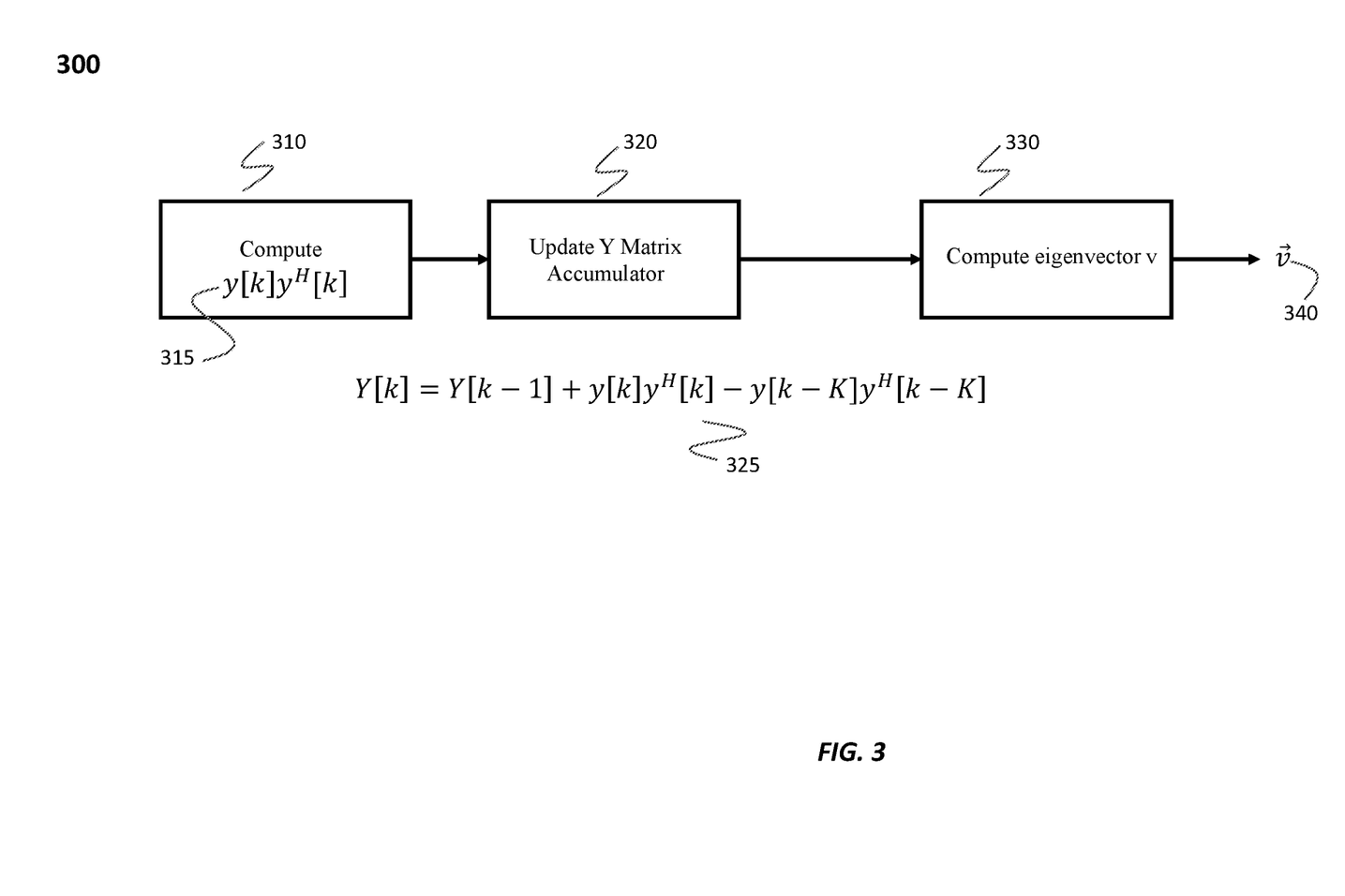
FIG. 3 is a diagram of a receiving device that includes an example of an eigen vector estimation design based on a batch estimation approach.

FIG. 3 is a diagram of a MAEC Vector Estimation design using batch estimation method, according to some embodiments of the present disclosure. For each incoming signal $y_0[k]$ 212, $y_1[k]$ 216, and $y_{N-1}[k]$ 220, a computation block 310 computes a value 315: $y[k] \cdot y^H[k]$. That is, for each received kth time sample at each of the N antennas, a [1×N] column vector is obtained and multiplied with its conjugate transpose to generate a [N×N] matrix.

Next, the processor sums up all the samples for the past 8 μs (LSTF duration) at block 320. That is, the processor electronics is configured to store in a buffer the N×k samples received at the N antennas and calculate a sum of the [N×N] matrices generated at block 310. The processor electronics updates the Y Matrix accumulator according to Equation (325):

$$Y[k] = Y[k-1] + y[k]y^H[k] - y[k-K]y^H[k-K] \quad (325)$$

That is, to compute the MAEC vector for LSTF, the MAEC Vector estimation module 222 sums the K samples $y[k] \cdot y^H[k]$ for the past 8 μs (i.e., duration of the LSTF).

The processor continues to block 330 at which the MAEC vector $\vec{v}$ 340 corresponding to the largest eigenvector can be obtained with any existing eigenvector computation algorithm. In some embodiments, since only the eigenvector corresponding to the largest eigenvalue is of interest, a power iteration method may be used. A person skilled in the art will understand any number of known eigenvector computation algorithm may be used to determine the largest eigenvector. In some embodiments, the MAEC vector $\vec{v}$ 340 may be computed and updated for every incoming sample, or every K samples.

However, batch estimation method as described above may incur long delays to determine the MAEC vector. Specifically, there may be a large number of samples for the 8 μs duration. Moreover, a good eigenvalue computation may incur large number of iterations which result in long processing delay. In addition, the LSTF may already be finished before an appropriate MAEC vector is obtained. Accordingly, additional techniques for MAEC vector estimation is described below which provide greater efficiency gains.

Figure 4:
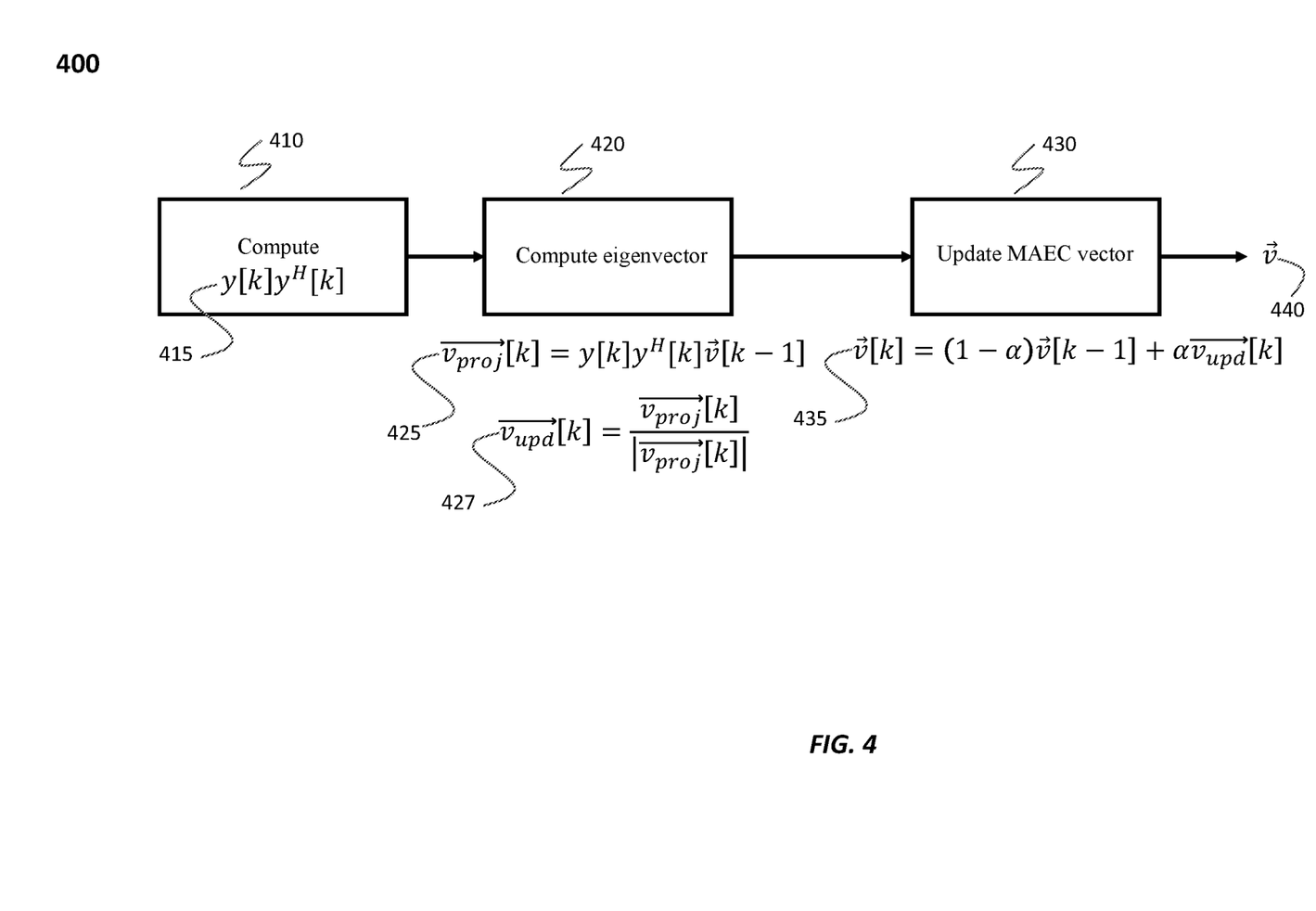
FIG. 4 is a diagram of a receiving device that includes an example of an eigen vector estimation based on a stochastic eigenvector update approach.

FIG. 4 is a diagram of a receiving device that includes an example of an eigen vector estimation based on a stochastic eigenvector update approach. As illustrated in FIG. 4, for each incoming signal $y_0[k]$ 212, $y_1[k]$ 216, and $y_{N-1}[k]$ 220, a computation block 410 computes a value 415: $y[k] \cdot y^H[k]$. That is, for each received kth time sample at each of the N antennas, a [1×N] column vector is obtained and multiplied with its conjugate transpose to generate a [N×N] matrix. Next, at the Eigenvector computation block 420, the eigenvalue is calculated based on the enhanced stochastic eigenvector update approach.

In contrast to the batch estimation method where the MAEC Vector estimation module 222 sums the K samples $y[k] \cdot y^H[k]$ for the past 8 μs to compute the MAEC vector for LSTF, the stochastic eigenvector update approach of FIG. 4 skips the summation step. Instead, at block 420, a projection vector $\vec{v}_{proj}$ is calculated, according to equation 425:

$$\vec{v}_{proj}[k] = y[k] y^H[k] \vec{v}[k-1] \quad (425)$$

That is, instead of computing and buffering the [N×N] matrix for all samples taken during the 8 μs duration, only the kth sample is required for calculating the projection vector $\vec{v}_{proj}$. The projection vector $\vec{v}_{proj}$ is computed in a manner similar to the power iteration method. In some embodiments, the projection vector $\vec{v}_{proj}$ is normalized, according to equation 427:

$$\vec{v}_{upd}[k] = \frac{\vec{v}_{proj}[k]}{\|\vec{v}_{proj}[k]\|} \quad (427)$$

Once the projection vector $\vec{v}_{proj}$ is calculated at block 420, the processing moves to an update block 430 where the MAEC vector is updated with a one pole filter (e.g., a low pass filter) with a parameter α. In some embodiments, the parameter α is a design parameter to control the convergence speed and variance. In particular, the MAEC vector $\vec{v}$ 440 is computed based on the Equation 435:

$$\vec{v}[k] = (1-\alpha)\vec{v}[k-1] + \alpha \vec{v}_{upd}[k] \quad (435)$$

That is, when the kth sample $y[k]$ arrives at the receiver, the corresponding MAEC vector $\vec{v}[k]$ 440 will be updated based on the MAEC vector $\vec{v}[k-1]$ for a previously received k−1 sample. Therefore, the system retains the MAEC estimation from the previous sample in calculating the MAEC vector $\vec{v}$ 440 for the most recent sample $y[k]$. Therefore, the projection vector $\vec{v}_{proj}$ only needs to be calculated once, and the corresponding MAEC vector $\vec{v}[k]$ 440 can be regularly updated based on the parameter α.

In some embodiments, the computation blocks 410 and 420 may be simplified by association. In particular, for every incoming signal $y_0[k]$ 212, $y_1[k]$ 216, and $y_{N-1}[k]$ 220, a scalar value $(y^H[k] \cdot \vec{v})$ is obtained and multiplied to the signal, e.g., $y_{N-1}[k]$ 220. Accordingly, the computational steps of first calculating a $y[k] \cdot y^H[k]$ value, followed by calculating the projection vector $\vec{v}_{proj}$ can be skipped.

Accordingly, techniques described with reference to FIG. 4 provide a simple and fast computation for eigenvector since there is no need for a buffer to store all the of received sample signals.

Figure 5:
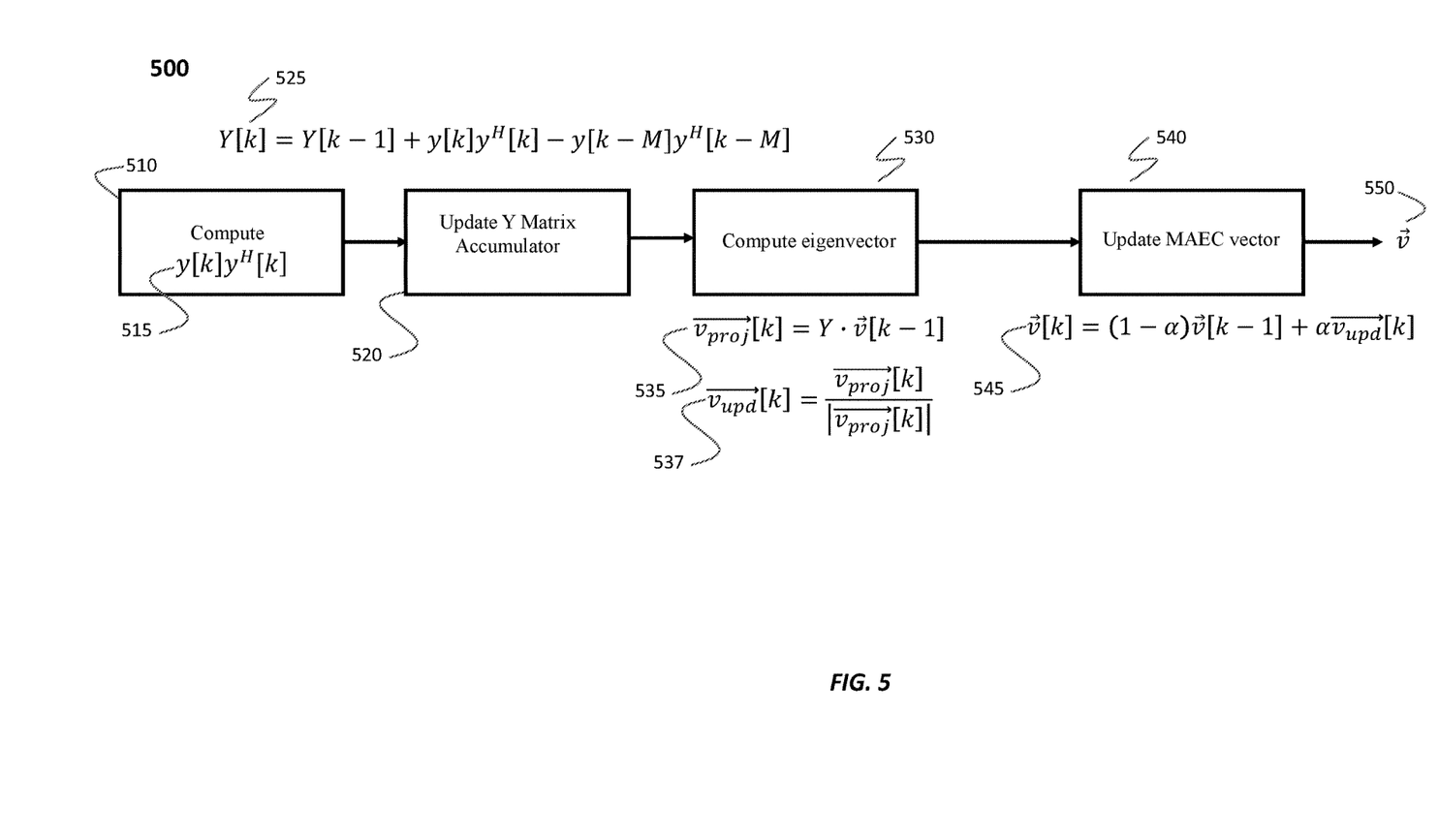
FIG. 5 is a diagram of a receiving device that includes an example of an eigen vector estimator based on a mini-batch eigenvector update approach.

FIG. 5 is a diagram of a receiving device that includes an example of an eigen vector estimation based on a mini-batch eigenvector update approach. As illustrated in FIG. 5, for each incoming signal $y_0[k]$ 212, $y_1[k]$ 216, and $y_{N-1}[k]$ 220 sampled at time k, a computation block 510 computes a value 515: $y[k] \cdot y^H[k]$. That is, for each received kth time sample at each of the N antennas, a [1×N] column vector is obtained and multiplied with its conjugate transpose to generate a [N×N] matrix. In contrast to the batch estimation method where the MAEC Vector estimation module 222 sums the K samples $y[k] \cdot y^H[k]$ for the past 8 µs to compute the MAEC vector for LSTF, the mini-batch eigenvector update approach of FIG. 5, only require the past M samples to be accumulated at block 520. Specifically, at block 520, the Y Matrix Accumulator generates a summed matrix Y for the past M samples in accordance with Equation 525:

$$Y[k]=Y[k-1]+y[k]y^H[k]-y[k-M]y^H[k-M] \quad (525)$$

In some embodiments, M is a design parameter selected to control the size of the buffer. In some implementations, the parameter M may be set to the number of sample of 0.8 µs, corresponding to the LSTF periodicity. Next, at the Eigenvector computation block 530, the eigenvalue is calculated based on the enhanced mini-batch eigenvector update approach.

At eigenvector computation block 530, a projection vector $\vec{v}_{proj}$ is calculated, according to equation 535:

$$\vec{v}_{proj}[k]=Y \cdot \vec{v}[k-1] \quad (535)$$

The projection vector $\vec{v}_{proj}$ is computed in a manner similar to the power iteration method. In some embodiments, the projection vector $\vec{v}_{proj}$ is normalized, according to equation 537:

$$\vec{v}_{upd}[k] = \frac{\vec{v}_{proj}[k]}{|\vec{v}_{proj}[k]|} \quad (537)$$

Once the projection vector $\vec{v}_{proj}$ is calculated at block 530, the processing moves to an update block 540 where the MAEC vector is updated with a one pole filter (e.g., a low pass filter) with a parameter α. In some embodiments, the parameter α is a design parameter to control the convergence speed and variance. In particular, the MAEC vector $\vec{v}$ 550 is computed based on the Equation 545:

$$\vec{v}[k]=(1-\alpha)\vec{v}[k-1]+\alpha\vec{v}_{upd} \quad (545)$$

That is, when the kth sample y[k] arrives at the receiver, the corresponding MAEC vector $\vec{v}[k]$ 550 will be updated based on a previous MAEC vector $\vec{v}[k-1]$ corresponding to the MAEC vector at k−1 time sample. Therefore, the system retains the estimation from the previous sample y[k−1] in calculating the MAEC vector $\vec{v}$ 550 for incoming sample y[k]. Therefore, the projection vector $\vec{v}_{proj}$ only needs to be calculated once, and the corresponding MAEC vector $\vec{v}[k]$ 550 can be regularly updated based on the parameter α.

Accordingly, techniques described with reference to FIG. 5 provide a more stable eigenvector computation and update process. However, as discussed above, the techniques discussed with reference to FIG. 5 require a buffer to store [N×M] Y samples.

Figure 6:
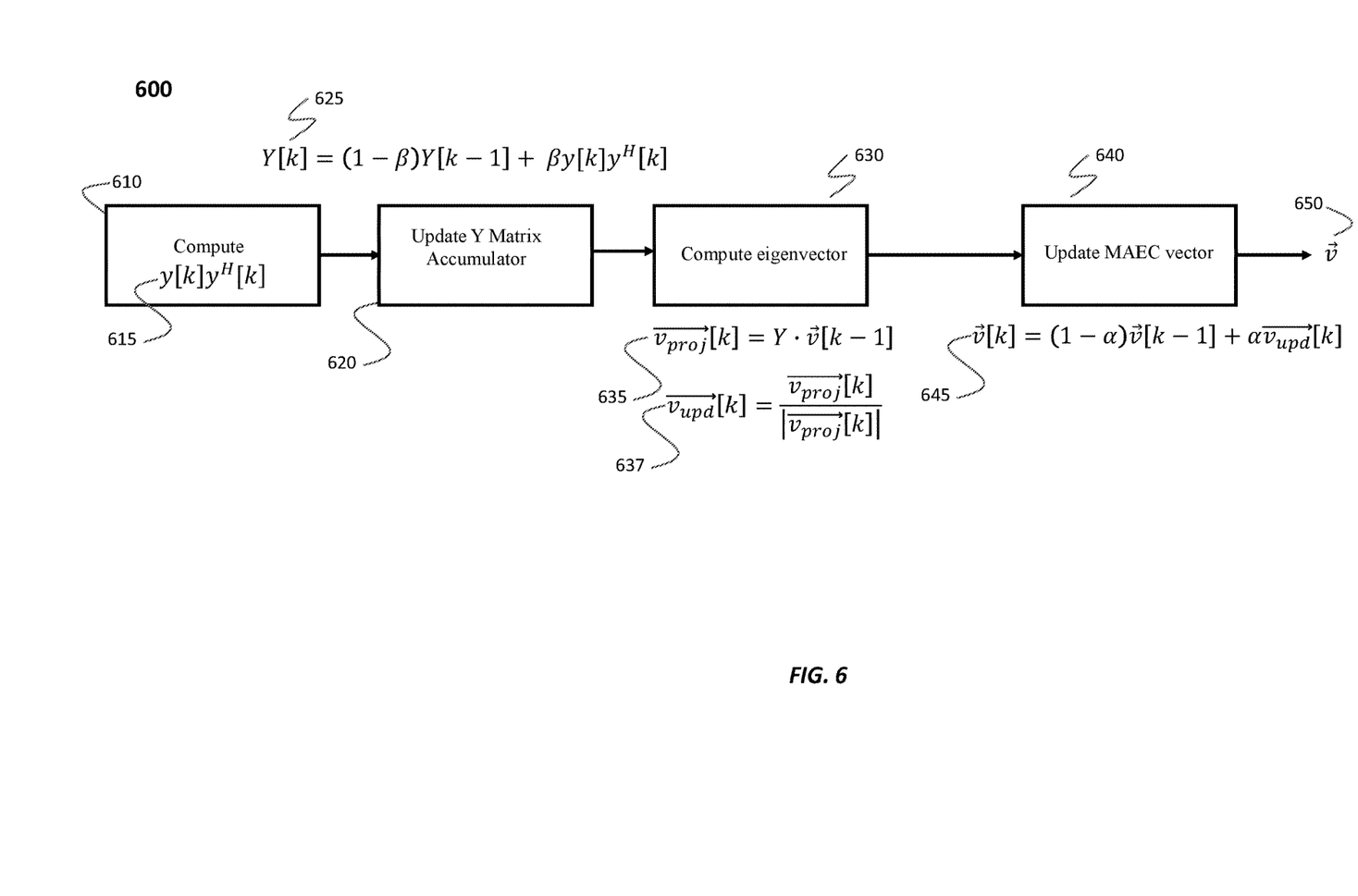
FIG. 6 is a diagram of a receiving device that includes an example of an eigen vector estimator based on a stochastic mini-bath eigenvector update approach.

FIG. 6 is a diagram of a receiving device that includes an example of an eigen vector estimation based on a stochastic mini-batch eigenvector update approach. As illustrated in FIG. 6, for each incoming signal $y_0[k]$ 212, $y_1[k]$ 216, and $y_{N-1}[k]$ 220 sampled at time k, a computation block 610 computes a value 615: $y[k] \cdot y^H[k]$. That is, for each received kth time sample at each of the N antennas, a [1×N] column vector is obtained and multiplied with its conjugate transpose to generate a [N×N] matrix.

In contrast to the batch estimation method where the MAEC Vector estimation module 222 sums the K samples $y[k] \cdot y^H[k]$ for the past 8 µs to compute the MAEC vector for LSTF, the stochastic mini-batch eigenvector update method only requires generating a summed matrix Y based on the value 615 for the currently received signal y[k] and a previously received signal y[k−1]. Thus, at block 620, the summed matrix Y, for a received signal y[k], is updated based on the following equation 625:

$$Y[k]=(1-\beta)Y[k-1]+\beta y[k]y^H[k] \quad (625)$$

The summed matrix Y is updated with a one-pole filter (e.g., a low pass filter). In some embodiments, the parameter β is a design parameter to control the memory length. Next, at the Eigenvector computation block 630, the eigenvalue is calculated based on the enhanced stochastic mini-batch eigenvector update approach.

At eigenvector computation block 630, a projection vector $\vec{v}_{proj}$ is calculated, according to equation 635:

$$\vec{v}_{proj}[k]=Y \cdot \vec{v}[k-1] \quad (635)$$

The projection vector $\vec{v}_{proj}$ is computed in a manner similar to the power iteration method. In some embodiments, the projection vector $\vec{v}_{proj}$ is normalized, according to equation 637:

$$\vec{v}_{upd}[k] = \frac{\vec{v}_{proj}[k]}{|\vec{v}_{proj}[k]|} \quad (637)$$

Once the projection vector $\vec{v}_{proj}$ is calculated at block 630, the processing moves to an update block 640 where the MAEC vector is updated with a one pole filter (e.g., a low pass filter) with a parameter α. In some embodiments, the parameter α is a design parameter to control the convergence speed and variance. In particular, the MAEC vector $\vec{v}$ 650 is computed based on the Equation 645:

$$\vec{v}[k]=(1-\alpha)\vec{v}[k-1]+\alpha\vec{v}_{upd}[k] \quad (645)$$

That is, when the sample y[k] arrives at the receiver, the corresponding MAEC vector $\vec{v}[k]$ 650 will be updated based on a previous MAEC vector $\vec{v}[k-1]$. Therefore, the system retains the estimation from the previous sample y[k−1] in calculating the MAEC vector $\vec{v}$ 650 for incoming sample y[k]. Therefore, the projection vector $\vec{v}_{proj}$ only needs to be calculated once, and the corresponding MAEC vector $\vec{v}[k]$ 650 can be regularly updated based on the parameter α.

Accordingly, techniques described with reference to FIG. 6 provide a more stable and simple eigenvector computation and update process without requiring a large buffer.

Figure 7:
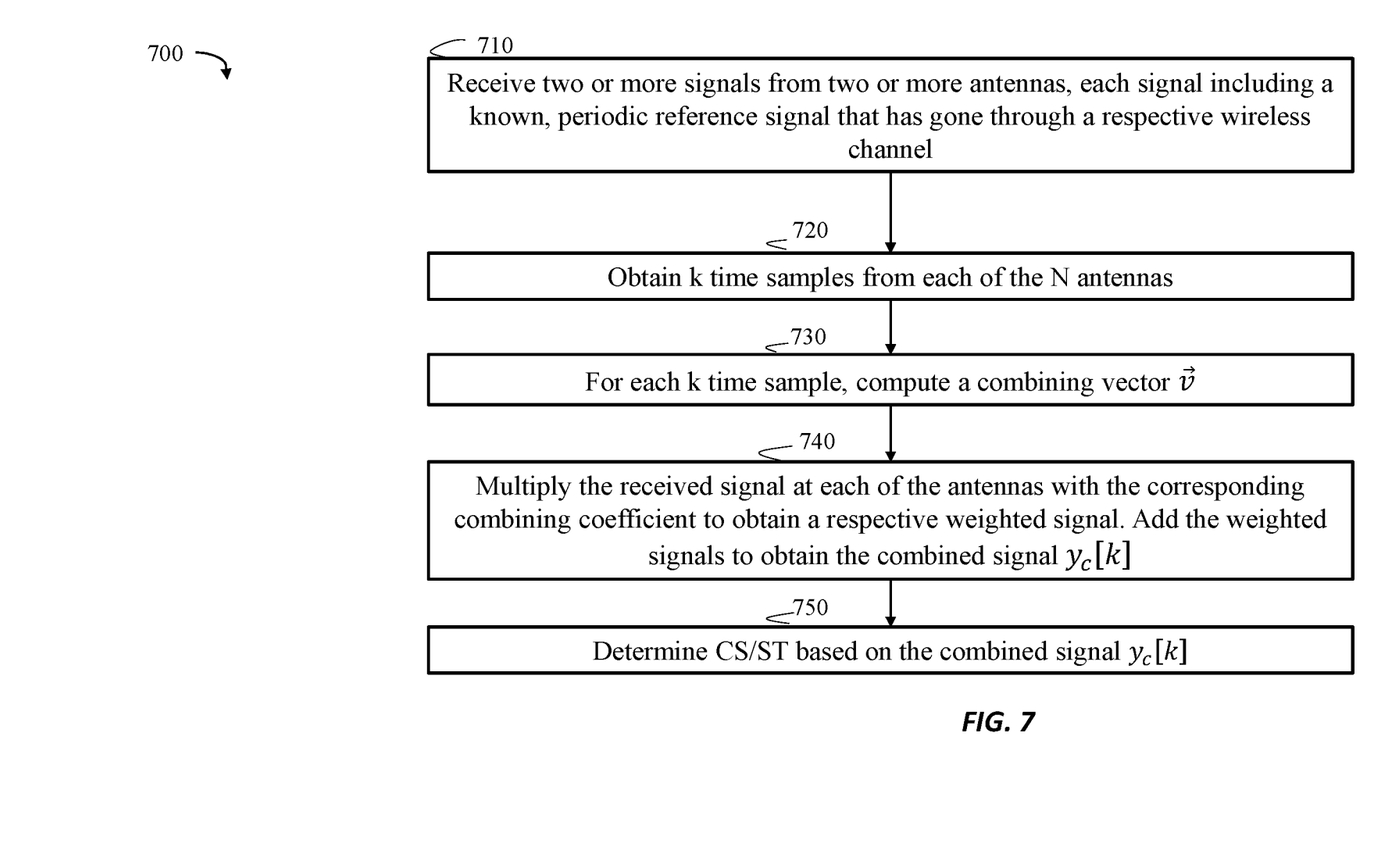
FIG. 7 is a flowchart showing a process of MAEC for carrier sensing/symbol timing in a multi-antenna communication system.

FIG. 7 is a flowchart showing a process of MAEC for carrier sensing/symbol timing in a multi-antenna communication system (e.g., a WLAN system that supports MIMO). The process 700 can be performed by a receiving device in the multi-antenna communication system. The receiving device can be a wireless communication device such as the access point 14 or a client station 25 in the system 10, or another device. The receiving device includes receiver and processor electronics for performing the process 700. In some embodiments, the processor electronics include a processor programmed with computer-readable instructions that, when executed, cause the receiving device to perform some or all operations of the process 700.

At 710, two or more signals are received form two or more antennas of the receiving device. Each of the two or more signals include a known, periodic reference signal that has gone through a respective wireless channel via one of the two or more antennas. In some embodiments, the known, periodic references signal is transmitted as a short training field (STF) sequence in a beginning part of a preamble for WLAN communication. For example, the known, periodic reference signal is the 0.8 μs sequence transmitted in the STF of an OFDM packet according to IEEE 802.11n or 802.11ac protocol. The received signals can be, for example, the signals $y_0[k]$ 212, $y_1[k]$ 216, and $y_{N-1}[k]$ 220 received from antennas 210, 214, and 218.

At 720, K samples from the received signals at each of the N antennas are obtained. That is, for each receive signal array $\vec{y}_0, \vec{y}_1, \ldots, \vec{y}_{K-1}$ at the N antennas, a corresponding 1×N column vector is formed. In practical systems, the signal on each antenna may vary before the AGC settles during LSTF. In some embodiments, the received signal y may be normalized before sending to MAEC Vector estimation module in order to improve the performance of the system.

At step 730, for each of the k time samples, a normalized MAEC vector $\vec{v}$ is computed by the MAEC vector estimation module 222. In some embodiments, the MAEC vector estimation module 222 may compute the normalized MAEC vector $\vec{v}$ using the batch estimation method as discussed above with reference to FIG. 3. In yet other embodiments, the MAEC vector estimation module 222 may compute the normalized MAEC vector $\vec{v}$ using (i) the stochastic eigenvector update method as discussed above with reference to FIG. 4; (ii) the mini-batch eigenvector update method as discussed above with reference to FIG. 5; or (iii) the stochastic mini-batch eigenvector update method as discussed above with reference to FIG. 6.

Next, the processing proceeds to step 740, where the received signal from each antenna is multiplied with the corresponding coefficient in the normalized MAEC vector $\vec{v}$, and added together to obtain a combined signal $y_c[k]$, described above with reference to FIG. 2. At step 750, carrier sensing (CS) and symbol timing (ST) of the two or more signals from the two or more antennas are performed based on the combined signal $y_c[k]$. In some embodiments, the combined signal can be regarded as a single-antenna signal and the carrier sensing/symbol timing techniques designed for a single-antenna system can be applied.

Figure 8:
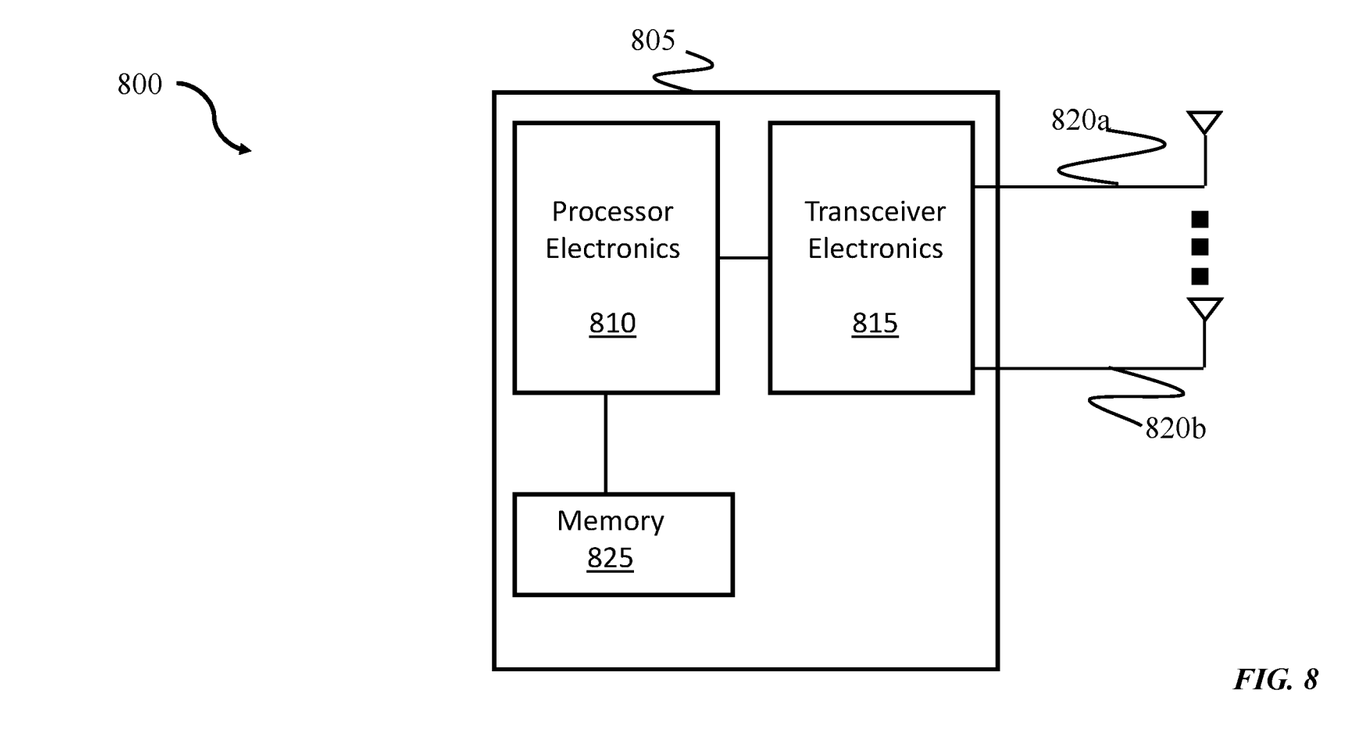
FIG. 8 shows a simplified block diagram of an example of a wireless communication device.

FIG. 8 shows a simplified block diagram 800 of an example of a wireless communication device 805. Various examples of device 805 include an access point (AP), a base station (BS), an access terminal (AT), a client station, or a mobile station (MS). For example, the device 805 can represent one or more of the AP 14 or client stations 25 in FIG. 1 or another device.

The device 805 can include processor electronics 210 such as one or more processors that implement methods effecting the techniques presented in this disclosure. The processor electronics 810 can be operable to execute computer-readable instructions that, when executed on the processor electronics 810, cause the device 805 to implement methods effecting the techniques presented in this disclosure. For example, the processor electronics 810 can cause the device 205 to perform MAEC for carrier sensing/symbol timing.

The device 805 can include transceiver electronics 815 (e.g., a transmitter, receiver, or transceiver) to send and/or receive wireless signals over one or more antennas 820a-820b. In some embodiments, transceiver electronics 815 can include multiple radio units. In some embodiments, a radio unit includes a baseband unit (BBU) and a radio frequency unit (RFU) to transmit and receive signals. In some embodiments, the device 805 includes dedicated circuitry for transmitting (e.g., a dedicated transmitter) and dedicated circuitry for receiving (e.g., a dedicated receiver). For example, transceiver electronics 815 can include one or more receivers that receive one or more signals from one or more antennas 820a-820b, transmitted over one or more WLAN channels.

The device 805 can include one or more memories 225 configured to store information such as data and/or instructions (e.g., computer-readable instructions that cause the device 805 to implement methods effecting the techniques presented in this disclosure.

Various embodiments discussed in conjunction with FIGS. 1-8 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., 14 and 25 in FIG. 1), and/or the like, are configured to include a set of electronic circuit components, and communicatively operate on one or more electronic circuits.

Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. Additionally, the techniques described above can be used to perform only carrier sensing or only symbol timing in certain implementations. In certain implementations, multitasking and parallel processing may be advantageous. Other variations are within the scope of the following claims.

What is claimed is:

1. A network device for carrier sensing and symbol timing in a multiple-antenna communication system, the network device comprising:
   a wireless receiver configured to receive two or more signals from two or more antennas, respectively, each received signal including a known, periodic reference signal transmitted over a respective wireless channel;
   processor electronics configured to:
      generate a set of column vectors comprising time samples obtained from each of the received signals at the two or more antennas;
      compute a multiple-antenna eigen-combining (MAEC) vector, wherein the MAEC vector is a combining gain vector determined by calculating an eigenvector corresponding to a largest eigenvalue from the set of column vectors corresponding to the received signals at the two or more antennas;
      multiply the respective received signals with a corresponding combining coefficient of the MAEC vector to obtain a respective weighted signal;
      generate a combined signal by summing the respective weighted signal; and
      perform carrier sensing and symbol timing on the two or more received signals based on the combined signal.

2. The network device according to claim 1, wherein the processor electronics is configured, when computing the MAEC vector, to:
   generate a sum matrix comprising a sum of each of the set of column vectors multiplied by their respective conjugate transpose; and
   compute the MAEC vector by determining an eigenvector corresponding to a largest eigenvalue of the sum matrix.

3. The network device according to claim 1, wherein the processor electronics is configured, when generating the set of column vectors, to:
   generate a set of [1×N] column vectors combining the received time samples from the respective received signals for a plurality of time samples, where N is the number of antennas; and
   wherein the processor electronics is configured, when computing a MAEC vector, to:
      compute a [N×N] matrix by multiplying the set of column vectors with their respective conjugate transpose;
      store each of the computed [N×N] matrix corresponding to each time sample;
      calculate a sum matrix by adding each of the computed [N×N] matrix; and
      compute the MAEC vector corresponding to the largest eigenvalue of the sum matrix.

4. The network device according to claim 3, wherein the processor electronics is configured to compute the largest eigenvalue of the sum matrix using a power iteration method.

5. The network device according to claim 1, wherein the processor electronics is configured, when computing a MAEC vector, to:
   generate a set of [1×N] column vectors combining the received time samples from the respective received signals for a plurality of time samples, where N is the number of antennas;
   compute a [N×N] matrix by multiplying each of the set of [1×N] column vectors with their respective conjugate transpose; and
   compute a projection vector based on the computed [N×N] matrix for a most recent time sample and previously received time samples.

6. The network device according to claim 5, wherein the processor electronics is further configured to:
   update the projection vector for the most recent time sample by applying a one pole filter to a normalized projection vector computed for the previously received time samples.

7. The network device according to claim 1, wherein the processor electronics is configured, when computing the MAEC vector, to:
   generate a set of [1×N] column vectors combining the received time samples from the respective received signals for a plurality of time samples, where N is the number of antennas; and
   compute a projection vector based on the [1×N] column vector for a most recent time sample and previously received time samples.

8. The network device according to claim 1, wherein the processor electronics is configured, when computing a corresponding MAEC vector, to:
   generate a set of [1×N] column vectors combining the received time samples from the respective received signals for M time samples, where N is the number of antennas and M is a number of time samples less than total number of received time samples;
   compute a [N×N] matrix by multiplying each of the column vectors with their respective conjugate transpose;
   store each of the computed [N×N] matrix corresponding to each of the M time samples;
   calculate a sum matrix by adding each of the computed [N×N] matrix;
   compute a projection vector based on the computed sum matrix corresponding to the most recent time sample; and
   update the projection vector for each subsequently received time sample by applying a one pole filter to the normalized projection vector computed for the previously received time samples.

9. The network device according to claim 1, wherein the processor electronics is configured, when computing a corresponding MAEC vector, to:
   generate a set of [1×N] column vectors combining the received time samples from the respective received signals for a plurality of time samples, where N is the number of antennas;
   compute a [N×N] matrix by multiplying each of the column vectors with their respective conjugate transpose;

compute a sum matrix combining the [N×N] matrix for the received time sample and previously received time samples;
update the sum matrix using a low pass filter;
compute a projection vector based on the updated sum matrix; and
update the projection vector for each received time sample by applying a one pole filter to the normalized projection vector computed for the previously received time samples.

10. The network device according to claim 1, wherein the known, periodic signal is transmitted as a short training field (STF) sequence in a beginning part of a preamble for wireless local area network (WLAN) communication.

11. A method for carrier sensing and symbol timing in a multiple-antenna communication system, the method comprising:
receiving, via a wireless receiver, two or more signals from two or more antennas, respectively, each received signal including a known, periodic reference signal transmitted over a respective wireless channel;
generating a set of column vectors comprising time samples obtained from each of the received signals at the two or more antennas;
computing a multiple-antenna eigen-combining (MAEC) vector, wherein the MAEC vector is a combining gain vector determined by calculating an eigenvector corresponding to a largest eigenvalue from the set of column vectors corresponding to the received signals at the two or more antennas;
multiplying the respective received signals with a corresponding combining coefficient of the MAEC vector to obtain a respective weighted signal;
generating a combined signal by summing the respective weighted signal; and
performing carrier sensing and symbol timing on the two or more received signals based on the combined signal.

12. The method according to claim 11, wherein computing the MAEC vector comprises:
generating a sum matrix comprising a sum of each of the set of column vectors multiplied by their respective conjugate transpose; and
computing the MAEC vector by determining an eigenvector corresponding to a largest eigenvalue of the sum matrix.

13. The method according to claim 11, wherein generating the set of column vectors comprises:
generating a set of [1×N] column vectors combining the received time samples from the respective received signals for a plurality of time samples, where N is the number of antennas computing the MAEC vector, and
wherein computing the MAEC vector comprises:
computing a [N×N] matrix by multiplying the set of column vectors with their respective conjugate transpose;
storing each of the computed [N×N] matrix corresponding to each time sample;
calculating a sum matrix by adding each of the computed [N×N] matrix; and
computing the MAEC vector corresponding to the largest eigenvalue of the sum matrix.

14. The method according to claim 13, further comprising:
computing the largest eigenvalue of the sum matrix using a power iteration method.

15. The method according to claim 11, wherein computing the MAEC vector comprises:

generating a set of [1×N] column vectors combining the received time samples from the respective received signals for a plurality of time samples, where N is the number of antennas;
computing a [N×N] matrix by multiplying each of the set of [1×N] column vectors with their respective conjugate transpose; and
computing a projection vector based on the computed [N×N] matrix for a most recent time sample and previously received time samples.

16. The method according to claim 15, further comprising:
updating the projection vector for the most recent time sample by applying a one pole filter to a normalized projection vector computed for the previously received time samples.

17. The method according to claim 11, wherein computing the MAEC vector comprises:
generating a set of [1×N] column vectors combining the received time samples from the respective received signals for a plurality of time samples, where N is the number of antennas; and
computing a projection vector based on the [1×N] column vector for a most recent time sample and previously received time samples.

18. The method according to claim 11, wherein the computing the MAEC vector comprises:
generating a set of [1×N] column vectors combining the received time samples from the respective received signals for M time samples, where N is the number of antennas and M is a number of time samples less than total number of received time samples;
computing a [N×N] matrix by multiplying each of the column vectors with their respective conjugate transpose;
storing each of the computed [N×N] matrix corresponding to each of the M time samples;
calculating a sum matrix by adding each of the computed [N×N] matrix;
computing a projection vector based on the computed sum matrix corresponding to the most recent time sample; and
updating the projection vector for each subsequently received time sample by applying a one pole filter to the normalized projection vector computed for the previously received time samples.

19. The method according to claim 11, wherein the computing the MAEC vector comprises:
generating a set of [1×N] column vectors combining the received time samples from the respective received signals for a plurality of time samples, where N is the number of antennas;
computing a [N×N] matrix by multiplying each of the column vectors with their respective conjugate transpose;
computing a sum matrix combining the [N×N] matrix for the received time sample and previously received time samples;
updating the sum matrix using a low pass filter;
computing a projection vector based on the updated sum matrix; and
updating the projection vector for each received time sample by applying a one pole filter to the normalized projection vector computed for the previously received time samples.

20. The method according to claim 11, wherein the known, periodic signal is transmitted as a short training field (STF) sequence in a beginning part of a preamble for wireless local area network (WLAN) communication.

* * * * *